Sept. 28, 1965　　　　TATSUO AIZAWA　　　　3,208,367
CONTINUOUS AMMONIA GAS DEVELOPING APPARATUS
FOR LIGHT SENSITIVE PAPERS
Filed March 19, 1962

INVENTOR

TATSUO AIZAWA

BY *James M. Drysdale*
ATTORNEY

United States Patent Office 3,208,367
Patented Sept. 28, 1965

3,208,367
CONTINUOUS AMMONIA GAS DEVELOPING APPARATUS FOR LIGHT SENSITIVE PAPERS
Tatsuo Aizawa, 6–34 Kuwazu-cho, Higashisumiyoshi-ku, Osaka, Japan
Filed Mar. 19, 1962, Ser. No. 180,718
2 Claims. (Cl. 95—89)

This invention relates to an apparatus for continuous development of light sensitive material such as diazo-type sensitive papers, by means of vapour such as ammonia vapour.

According to the present invention, in apparatus for the continuous ammonia gas development of light sensitive material, there is provided inner walls in an ammonia tank which is similar to the conventional and well known ammonia tank, and which is so devised that ammonia vapour is prevented from leakage by means of providing an endless belt such as a rubber blanket which acts as a conveyor of exposed sensitive papers, in close contact with over-hanging parts of the ammonia tank, so that an outer chamber is formed around an inner chamber. On the side of the inner walls which is facing the endless rubber blanket, there is provided a plurality of vapour outlets or gas feeders with jet-slots which are little wider than the predetermined size of sensitive papers to be developed by this apparatus. On both side inner walls, openings are provided, and blowers are mounted near each of the openings, within the inner chamber.

The ammonia developing vapour which is produced by a heater within the ammonia tank, is agitated quickly in proper form for developing sensitive papers, and such agitated vapour is strongly blown out through the jet-slots of the gas feeders upon the sensitized surface of the sensitive paper which is being conveyed on the endless rubber blanket. The ammonia vapour blown out through jet-slots flows into the outer chamber through the portions between the gas feeders, and is mixed with fresh vapour there, and inhaled into the inner chamber, then repeatedly blown out upon the sensitive papers through the jet-slots by the blowers provided within the inner chamber.

Figure 1:
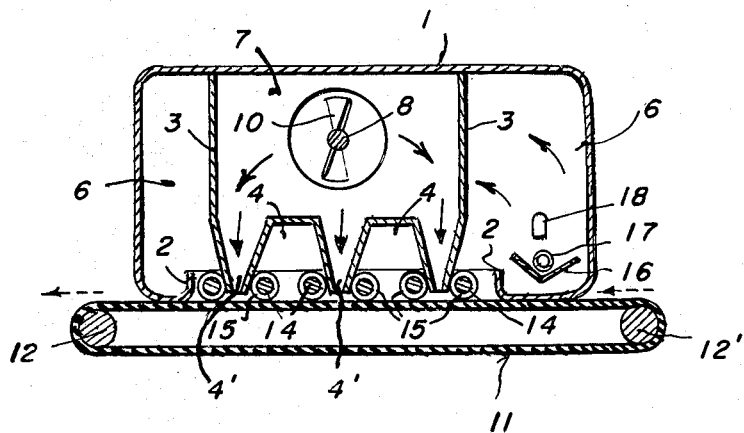
Figure 2:
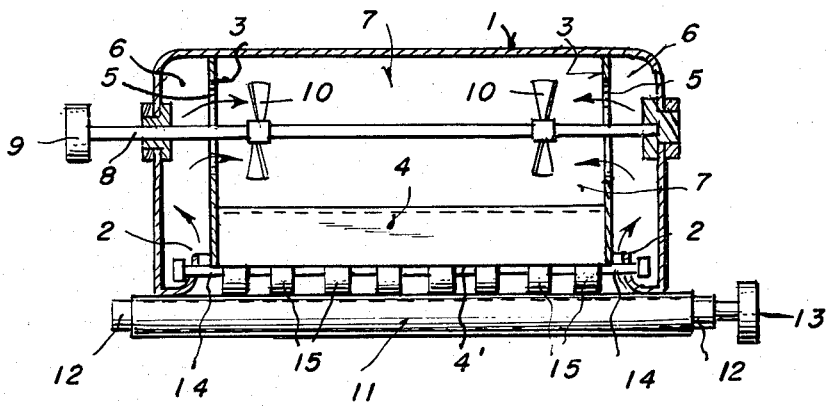

One construction of the apparatus of this invention is shown in an accompanying drawing, in which FIGURE 1 is a sectional side view of the apparatus, and FIGURE 2 is a sectional front view of the apparatus.

Referring to the drawing, the apparatus of this invention is the same as the conventional and well known ammonia tank shown at 1, and endless vapour in previous conveyor such as a rubber blanket 11 which is supported and driven by means of rollers 12 and 12', over-hanging rim parts 2 define an opening, the rim being in close contact with the endless rubber blanket so as to prevent the ammonia vapour from leakage between the contact portions of the over-hanging parts and the endless rubber blanket, ammonia trough 16, a heater 17 for the purpose of vapourizing the ammonia liquid, and an ammonia liquid suppling source 18.

According to this invention, however, within the block shaped ammonia tank 1, there are inner walls 3 provided so that an outer oblong in plan chambre 6 is formed around a similar shaped chamber 7. On the side of the inner walls 3 nearest to the endless rubber blanket 11 (the front of the block), there is formed a plurality of converging gas feeders 4 which are a little wider than the predetermined size of sensitive papers to be developed by this apparatus, and one each point of the gas feeders 4, a jet-slot 4' is provided. On each upper part of the side inner walls 3, an opening 5 is provided, and blowers 10 are mounted within the inner chamber 7, and near both of the openings 5.

In the same manner as in the conventional and well known apparatus, the aqueous developer solution such as ammonia liquid is supplied into an ammonia trough 16, is heated by a heater 17 into a vapour which, however, is sent from the outer chamber 6 into the gas feeders 4 through the openings 5 and the inner chamber 7 and then blown out rapidly and strongly upon the sensitized surface of the sensitive paper which is being conveyed on the endless rubber blanket 11, through the jet-slots 4' by the blowers 10. In doing so, the ammonia vapour is agitated so strongly, rapidly and evenly within the inner chamber 7 by the blowers 10 that it assures that the proper coagulation and reaction and absorption of the ammonia vapour can be conducted rapidly and sufficiently on the sensitized surface of the sensitive papers.

Furthermore, as described hereinbefore, the sensitive papers can meet with sufficient ammonia vapour over the entire width at several places by providing a plurality of the jet-slots 4'. Accordingly, the apparatus assures that the acid of the coating chemical can be neutralized rapidly, and the coupling of the dye-stuff on the unexposed parts of the sensitive papers can be conducted rapidly and sufficiently, so that even and clear images of the papers to be copied can be obtained.

The remains of the ammonia vapour blown out upon the sensitive papers through each of the jet-slots 4', flows immediately into the outer chamber 6 through the portions between the gas feeders 4 in consequence of circulating the ammonia vapour from the outer chamber 6 into the inner chamber 7 by the blowers 10, and there is no danger of a leak of ammonia vapour from the portions between the over-hanging parts 2 of the ammonia tank 1 and the endless rubber blanket 11 which are in close contact with each other. The ammonia vapour flowing into the outer chamber 6 is mixed up with fresh ammonia vapour produced successively therein, and inhaled or sucked into the inner chamber 7 through the openings 5, then repeatedly blown out once and again upon the sensitive papers through the jet-slots 4' by the blowers 10.

The numeral 8 indicates a shaft of the blowers 10 and has, at one end thereof, a wheel 9 which is connectively driven by power. Another wheel 13 is mounted on an end of the conveyor drive roller 12 or 12', and driven by power. The numeral 14 represents shafts each carrying a plurality of small rollers 15 which are provided at regular intervals on each shaft. Each shaft 14 is supported at both edges of the overhanging parts 2 of the ammonia tank 1. A plurality of the small rollers 15 move in contact with the endless rubber blanket 11 in consequence of moving the rubber blanket.

The solid-line lined arrows in the drawings indicate the direction of circulation of the ammonia vapour, and the dotted arrows show the direction of movement of the endless rubber blanket 11.

In the apparatus of this invention, an outer chamber 6 is formed around an inner chamber 7 by means of providing inner walls 3 within an ammonia tank 1 which is similar to the conventional and well known one for the continuous gas developing apparatus for light sensitive papers. On the side of the inner walls 3 which face the endless rubber blanket 11, there is provided a plurality of gas feeders 4 with jet-slots 4'. Openings 5 are provided on both side inner walls 3 and near the openings blowers 10 are mounted within the inner chamber 7.

In the above construction, it is obvious that the ammonia vapour can be mixed up in a moment for properly developing sensitive papers immediately after commencing the operation, and can be blown out rapidly and strongly upon the entire sensitized surface of the sensitive papers. Accordingly, the developing operation can be started more quickly than that of the conventional apparatus for ammonia gas developing of sensitive papers, and the remains of the ammonia vapour blown out upon the sensitive papers can be promptly circulated back into the inner chamber through the portions between the gas feeders, and the outer chamber with fresh vapour and openings on the inner walls without any leakage from the portions between the over-hanging parts of the ammonia tank and the endless rubber blanket which are in close contact with each other. Therefore, a quick and clear development of sensitive papers can be conducted, and the developing operation can be efficient.

While we have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Apparatus for continuous vapour development of light sensitized paper, comprising, a block shaped tank including a planar front side and an opposed back side, the front side formed with a continuous peripheral rim to define therein an oblong opening, an endless vapour impervious belt conveyor for carrying exposed sensitized papers, the belt being trained in close contact with the rim and extending beyond both the width and length of the opening to thus prevent vapour leakage between the tank and conveyor, an inner or central chamber within the tank with imperforate walls extending from the back sides of the tank towards and adjacent the opening in the front side, the inner chamber being similar in shape in a plane parallel to the plane of the opening, but of lesser breadth and width than the opening, thus forming a vapour passage between the portion of the inner chamber adjacent the opening and the remainder outer portion of the tank, the front portion of the inner chamber adjacent the opening and the conveyor formed with a plurality of spaced converging vapour outlets with slot discharges, the spaces outside of and between the outlets forming vapour passages from the slots to the outer portion of the tank, axially aligned openings in a pair of opposed inner walls, thus providing a vapour inlet from the outer portion of the tank to the inner chamber, means within the outer portion of the tank operative to generate a vapour developer from a supply of an aqueous gas solution, and a blower mounted in the inner chamber axially of and near each opening in the inner wall, with the suction sides adjacent the openings to thus inhale vapour from the outer portion of the tank, agitate the vapour, and then to strongly blow it out through the slot discharges of the vapour outlets onto the sensitized and exposed papers, the vapour developer, due to its changing pressures passing from the generator in the outer tank through each aligned opening to the inner tank, then through the slot discharges of the vapour outlets towards the exposed sensitized papers carried by the conveyor, where some of it is reacted with the light sensitized material, and the remainder passes around the outside of the vapour outlets and into the outer portion of the tank, where it is mixed with freshly generated vapour developer, thus causing continuous vapour movement from the outer tank to the inner tank and past the exposed light sensitized paper.

2. Apparatus for continuous development comprising a block shaped tank including a closed back wall and a closed peripheral wall extending from the back wall to the front, the front having an opening formed by a continuous peripheral rim, an endless conveyor belt impervious to vapour having one run closing said front opening by overlapping said peripheral rim, inner peripheral wall means extending from said back wall to adjacent said peripheral rim defining a peripheral chamber and an inner chamber, both chambers being within said block shaped tank, passage means between said peripheral chamber and said inner chamber, means to force vapour from one of said chambers to the other chamber through said passage means and to cause said vapour as it passes along the edges of the inner peripheral wall and the impervious conveyor as sheet material is conveyed along said front opening to effectively contact the sheet material carried by said impervious conveyor whereby the vapour will cause development of the sheet material, spaced means located in the front opening in said block shaped tank for engaging said conveyor and guiding sheet material carried by said conveyor to maintain said sheet material in smooth condition, and means for supplying and maintaining developing vapour in said chambers in proper condition for developing said sheet material carried by said conveyor whereby the circulating vapour will effectively contact the sheet material as the vapour passes from one chamber to the other chamber.

References Cited by the Examiner

UNITED STATES PATENTS

| | | | |
|---|---|---|---|
| 2,492,781 | 12/49 | Berggren | 95—89 |
| 2,761,365 | 9/56 | Bridgewater | 95—94 |

FOREIGN PATENTS 505,652   9/54   Canada.

NORTON ANSHER, *Primary Examiner.*

D. B. LOWE, *Examiner.*